March 28, 1933. L. D. FISKIN 1,903,176
VEHICLE DUMP
Filed Sept. 22, 1931 2 Sheets-Sheet 1
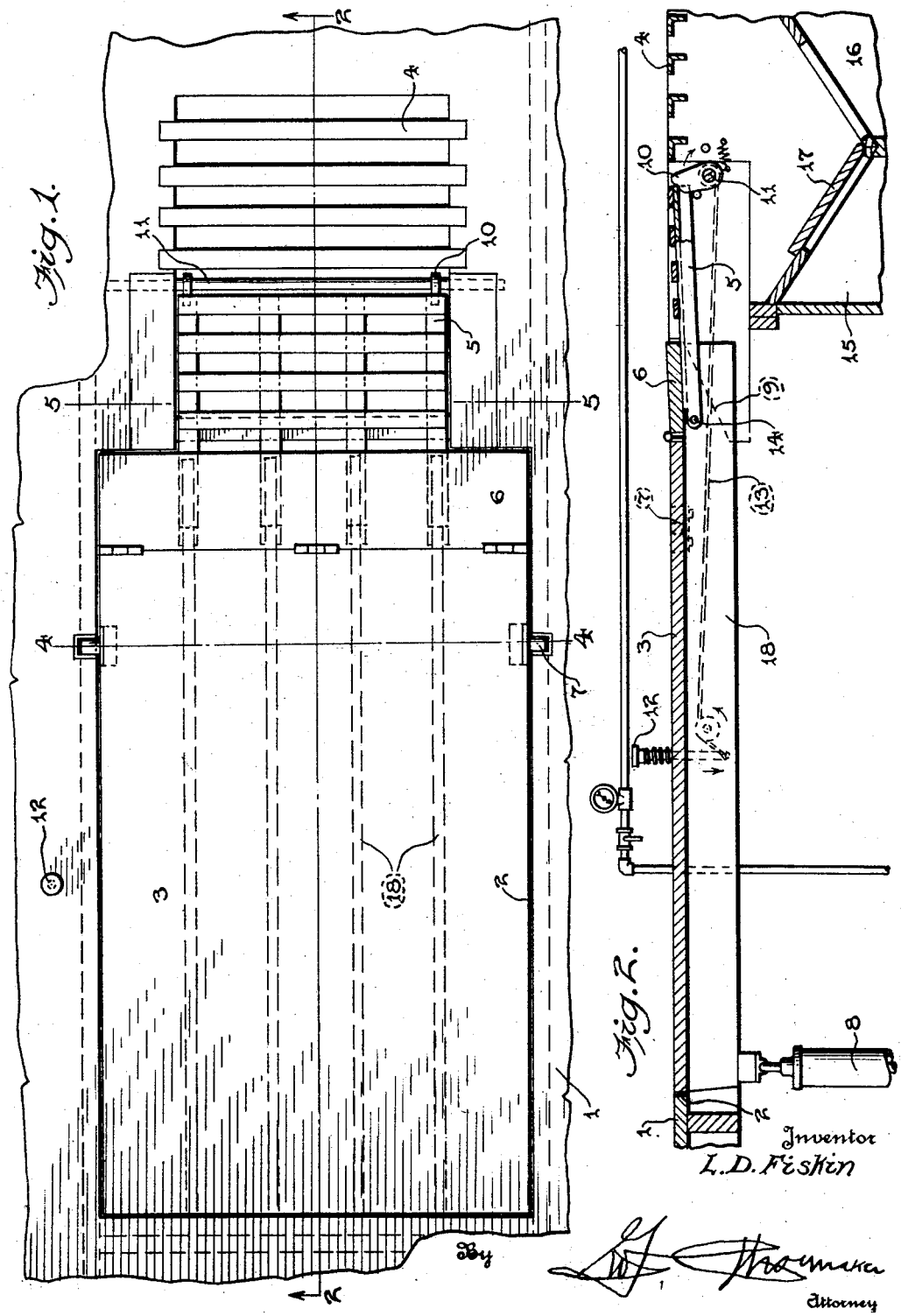

March 28, 1933.  L. D. FISKIN  1,903,176
VEHICLE DUMP
Filed Sept. 22, 1931   2 Sheets-Sheet 2
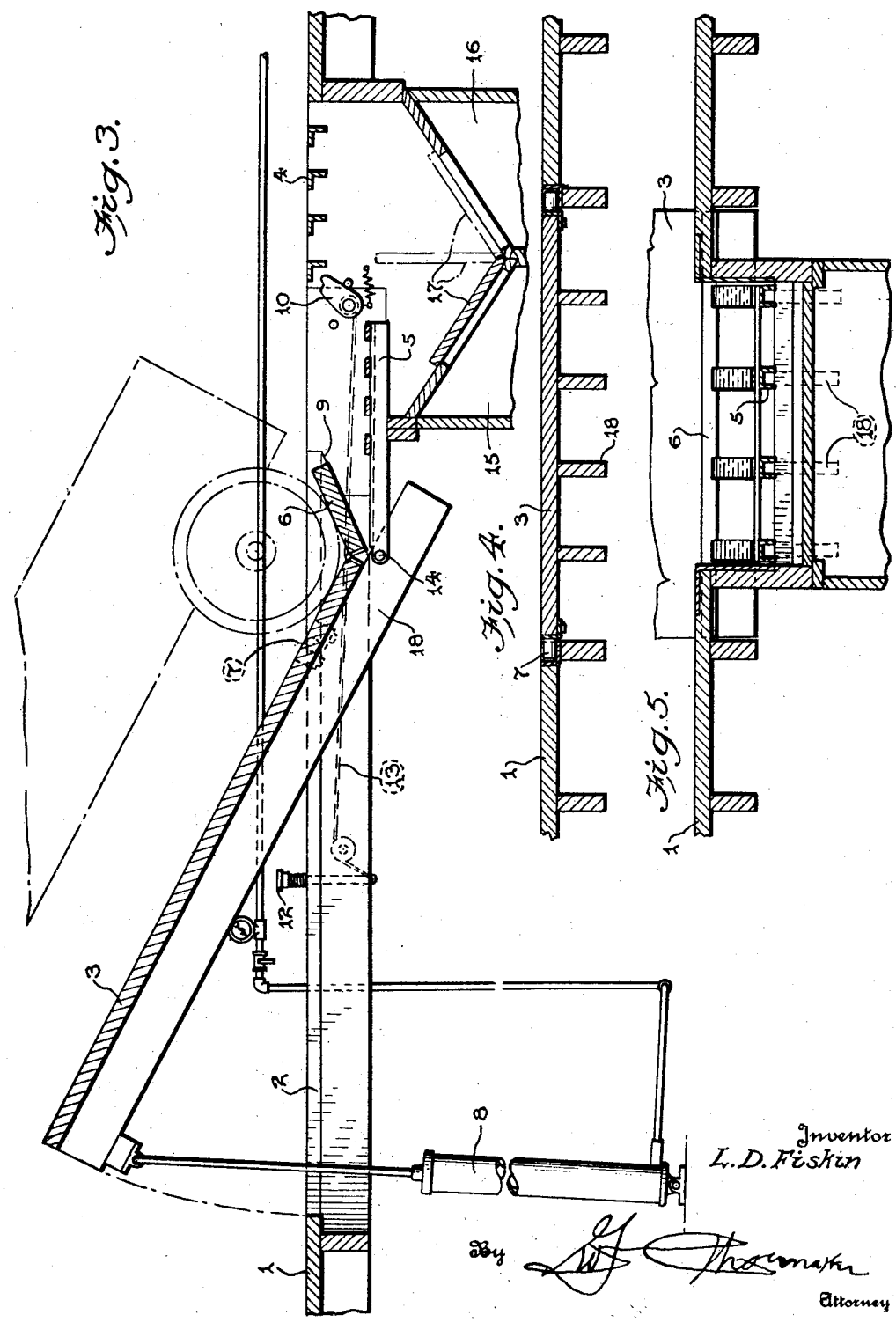
Inventor
L. D. Fiskin
By
Attorney Patented Mar. 28, 1933

1,903,176

UNITED STATES PATENT OFFICE

LESLIE D. FISKIN, OF DARROUZETT, TEXAS

VEHICLE DUMP

Application filed September 22, 1931. Serial No. 564,451.

The invention relates to apparatus, whereby vehicles may discharge their loads by tilting with a dumping platform upon which they are run.

The invention provides a construction which precludes injury to the vehicle equipment, such as the spare tire, tire carrier, tail light, license tag and the like mounted upon the rear of the vehicle and frequently damaged by projecting parts of the dump during the discharging of the load incident to the tilting of the platform upon which the vehicle is supported.

The invention provides a simplified arrangement of dump in which a grate is connected with the dumping platform to drop when the platform tilts to discharge the load, thereby clearing the vehicle equipment and preventing injury thereto.

For a full understanding of the invention and the merits thereof, reference is to be had to the drawings hereto attached and the subjoined description, in which corresponding parts are designated in the several views of the drawings and referred to in the specification by like reference characters.

In the drawings:—

Figure 1 is a top plan view of a vehicle dump illustrative of an embodiment of the invention.

Fig. 2 is a vertical, longitudinal section on the line 2—2 of Fig. 1, looking in the direction designated by the arrows.

Fig. 3 is a detail sectional view showing the disposition of the parts when the platform is tilted to discharge the load of a vehicle mounted thereon.

Fig. 4 is a detail transverse sectional view on the line 4—4 of Fig. 1.

Fig. 5 is a view similar to Fig. 4, taken on the line 5—5 of Fig. 1.

The numeral 1 designates the floor of a warehouse or grain elevator, the same being provided with an opening 2 in which is fitted a dumping platform 3, a stationary grate 4, a movable grate 5, and a chock 6. The dumping platform 3 is pivotally mounted adjacent the end to which the chock 6 is pivoted, as indicated at 7. A fluid lift 8 is associated with the platform 3 to effect a tilting thereof to dump the load of a vehicle supported thereon. The chock 6 consists of a narrow platform which is hinged to the platform 3 and adapted to be supported in the plane thereof by extensions of the sills or beams 18 forming the under structure of the dumping platform.

Inclined supports 9 are provided at opposite sides of the opening 2 and engage the ends of the chock 6 and hold the same in proper position both when the platform 3 is in normal position, as indicated in Fig. 2 of the drawings, or when tilted, as indicated in Fig. 3 of the drawings. When the dumping platform 3 is tilted, as indicated in Fig. 3 of the drawings, the chock 6 is likewise tilted, but in reverse order so as to engage the rear wheels of a vehicle and block the latter against rearward movement when tilted to discharge the load. When the platform 3 is in normal position, as indicated most clearly in Fig. 2 of the drawings, the chock 6 is supported upon the rear extensions of the beams or sills 18. When the platform 3 is tilted, the chock 6 is supported by the rests 9, as indicated most clearly in Fig. 3 of the drawings.

The grate 4 is stationary, whereas the grate 5 is movable and mounted to drop when the platform 3 tilts. The drop grate 5 is pivoted to the extensions of the parts 18 so that when the platform 3 is in normal position, the grate 5 occupies a position about in the plane of the stationary grate 4, platform 3 and chock 6, as indicated most clearly in Fig. 2 of the drawings. Latch members 10 are provided to engage the free end of the grate 5 and normally support the same, as indicated most clearly in Fig. 2 of the drawings. These latch members 10 are carried by a shaft 11 which is mounted transversely of the opening 2. A treadle 12 or like part is connected by means of a flexible element 13 to one of the latch members 10 or like part whereby to turn the shaft 11 and effect a simultaneous release of the latch members from the grate 5 to permit the latter to drop when the platform 3 is tilted.

The movable grate 5 comprises spaced strips and supporting bars, the latter being channeled so as to embrace the sides of the beams 18 to which they are pivoted at 14.

The numerals 15 and 16 designate grain bins, chutes or hoppers, and a valve 17 is associated therewith to direct the grain into one or the other of the bins in a manner well understood.

When a truck, wagon or analogous vehicle is run upon the floor 1 to proper position over the opening 2 to discharge its load, the grate 5 is released by pressure exerted upon the treadle 12 or like part which results in a withdrawal of the latch members 10 from the said movable grate. Fluid pressure is now supplied to the cylinder of the lift 8 with the result that the platform 3 is tilted. The chock 6 engages the rear wheels of the vehicle and blocks backward movement thereof. As the platform 3 tilts, the movable grate 5 drops, thereby clearing the vehicle and the equipment thereof with the result that injury to a spare tire and to the tail light, license tag and the like, is prevented. After the load has been discharged the platform 3 assumes normal position and at the same time the chock 6 and grate 5 are likewise returned to normal position ready for the next operation.

What is claimed is:—

1. In a vehicle dump and in combination with the dumping platform, a grate pivoted to the discharge end of the dumping platform to move therewith and drop to a position lower than said platform as the platform tilts to clear the vehicle and prevent injury to the equipment thereof, means for limiting the drop of the grate, and latch means for supporting the grate in normal position.

2. In a vehicle dump and in combination with the tilting platform, a chock pivotally connected to the discharge end of the platform to move therewith to a position below the normal plane of the platform, supporting means for engaging the chock to maintain it in normal position, a grate pivotally connected to the tilting platform and adapted to drop to a position below the platform as the platform tilts so as to clear the vehicle and prevent injury to the equipment thereof, and means for limiting the drop of the grate.

3. A vehicle dump comprising a floor having an opening for the passage of the load when dumped from a vehicle, a tilting platform disposed within the opening of the floor, a stationary grate at the end of the opening opposite that receiving the dumping platform, a chock and movable grate pivotally connected to the tilting platform and adapted in normal position to lie in the plane of the fixed grate and platform, said platform when tilted causing the chock to assume an upwardly inclined position with the uppermost free end thereof below the normal plane of the platform, and said grate through its connection with the platform being capable of downward movement to a substantially horizontal position below the platform, and means for limiting the downward movement of the grate.

4. In a vehicle dump of the character specified and in combination with the vehicle supporting dump platform, supporting means connected to and extending beyond the discharge end of the platform, a chock pivotally connected to the platform inwardly of the supporting means and normally supported on the latter, a grate pivotally connected to the said supporting means adjacent the pivotal connection of the chock and having the greater portion thereof extending normally parallel to the platform beyond the end of said supporting means, said platform when tilted causing the chock to assume an upwardly inclined position with the uppermost free end thereof below the normal plane of the platform, and said grate through its connection with the supporting means being capable of downward movement to a substantially horizontal position below the platform.

5. A vehicle dump comprising a floor having an opening for the passage of the load when dumped from a vehicle, a tiltable platform disposed within the opening of the floor, beams extending substantially throughout the length of the underside of said platform and projecting beyond the discharge end thereof, a chock pivotally connected to the platform and normally supported by the projecting ends of said beams, a grate pivotally connected to the said projecting ends of said beams, said platform when tilted causing the chock to assume an upwardly inclined position with the uppermost free end thereof below the normal plane of the platform, and said grate through its connection with the beams being capable of downward movement to a substantially horizontal position below the platform, and means for limiting the downward movement of the grate.

In testimony whereof, I have hereunto set my hand.

LESLIE D. FISKIN.